United States Patent
Accapadi et al.

(10) Patent No.: US 9,465,807 B2
(45) Date of Patent: *Oct. 11, 2016

(54) MANAGEMENT OF FILE CACHE

(71) Applicant: International Business Machines Corporation, Armonk, NY (US)

(72) Inventors: Mathew Accapadi, Austin, TX (US); Grover C. Davidson, II, Round Rock, TX (US); Dirk Michel, Austin, TX (US); Bret R. Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 195 days.

This patent is subject to a terminal disclaimer.

(21) Appl. No.: 14/057,716

(22) Filed: Oct. 18, 2013

(65) Prior Publication Data
US 2015/0113225 A1  Apr. 23, 2015

(51) Int. Cl.
*G06F 17/30* (2006.01)
*G06F 12/08* (2016.01)
*G06F 12/12* (2016.01)

(52) U.S. Cl.
CPC ..... *G06F 17/30132* (2013.01); *G06F 12/0891* (2013.01); *G06F 12/126* (2013.01); *G06F 12/127* (2013.01); *G06F 17/30067* (2013.01); *G06F 2212/463* (2013.01)

(58) Field of Classification Search
CPC ..... G06F 12/12; G06F 12/123; G06F 12/126
See application file for complete search history.

(56) References Cited

U.S. PATENT DOCUMENTS

| | | | |
|---|---|---|---|
| 6,412,045 B1* | 6/2002 | DeKoning et al. | 711/135 |
| 2007/0067497 A1* | 3/2007 | Craft et al. | 709/250 |
| 2009/0037660 A1* | 2/2009 | Fairhurst | 711/129 |
| 2012/0054447 A1 | 3/2012 | Swart et al. | |
| 2012/0143928 A1 | 6/2012 | Yankov et al. | |

OTHER PUBLICATIONS

Novell, "Tuning Server Memory", Product Doc., © 2013 Novell. http://www.novell.com/documentation/nw6p/?page=/documentation/nw6p/smem_enu/data/h9kdb57n.html.
"Class LRUFiles Cache", (Commons VFS 2.0 API), © 2002-2011 The Apache Software Foundation. http://commons.apache.org/proper/commons-vfs/apidocs/org/apache/commons/vfs2/cache/LRUFilesCache.html.

* cited by examiner

*Primary Examiner* — Ryan Bertram
(74) *Attorney, Agent, or Firm* — Thomas E. Tyson; Nicholas D. Bowman

(57) ABSTRACT

A method and computer program product for managing a file cache with a filesystem cache manager is disclosed. The method may include installing the filesystem cache manager for the file cache by a mount command. The filesystem cache manager may include a specified time interval and a first cache elimination instruction. The method may further include starting a first timer upon the installation of the filesystem cache manager. The method may further include running the first cache elimination instruction when the first timer reaches the specified time interval.

14 Claims, 3 Drawing Sheets

MANAGEMENT OF FILE CACHE

TECHNICAL FIELD

Embodiments described herein generally relate to electronic memory, and more specifically, to managing a file cache.

BACKGROUND

Modern computer systems, such as servers, use a packaged type of volatile memory in their memory system. The memory system is the place where the computer holds current programs and data that are in use. These programs in the memory system hold the instructions that the processor executes and the data that those instructions work with. The memory system is an important part of the main processing subsystem of the computer, tied in with the processor, cache, motherboard, and chipset allowing the computer system to function.

SUMMARY

Embodiments of the disclosure provide for a method and computer program product for managing a file cache with a filesystem cache manager. The method may include tuning the filesystem cache manager for the file cache by a mount command. The mount command may include a specified time interval and a first cache elimination instruction. The method may further include starting a first timer upon the completion of the tuning of the filesystem cache manager. The method may further include running the first cache elimination instruction when the first timer reaches the specified time interval by the filesystem cache manager.

An embodiment is directed to a computer program product for managing a file cache with a filesystem cache manager. The computer program product may include tuning the filesystem cache manager for the file cache by a mount command. The mount command may include a specified time interval and a first cache elimination instruction. The computer program product may further include starting a first timer upon the completion of tuning of the filesystem cache manager. The computer program product may further include running the first cache elimination instruction when the first timer reaches the specified time interval by the filesystem cache manager.

BRIEF DESCRIPTION OF THE DRAWINGS

Features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments may be practiced and to further enable those of skill in the art to practice embodiments of the invention. It is also to be understood that the descriptions of the embodiments are provided by way of example only, and are not intended to limit the scope of the embodiments as claimed. In the figures of the accompanying drawings, like reference numerals may refer to similar elements or steps.

DETAILED DESCRIPTION

A computer system may use a memory system. This memory system may include a filesystem cache manager. The filesystem cache manager may be created by an operating system. The filesystem cache manager may be tuned by a mount command. Tuning done by the mount command may include, but is not limited to, activating, organizing, setting up, installing rules and orders, preparing, or operating the filesystem cache manager. The tuning may include rules or orders that control the storing of file pages of programs, files, or data being used by or on the computer system in a file cache. The file cache may be filled with file pages of varying importance or use to the operation of the computer or program. Some file pages may be of immediate importance or use, other file pages may be important or useful after a period of time. The filesystem cache manager may have a controls system, either built into or in communication with it, which may control the input, removal, or access of the file pages stored in the file cache. The control system may use cache elimination instructions to remove file pages from the cache. In various embodiments, the filesystem cache manager may be part of either a virtual memory manager or filesystem.

The mount command that is used in tuning the filesystem cache manager may include or reference a timer, a specified time interval, and one or more cache elimination instructions. In various embodiments, the mount command may be a generalized administrative interface that is used to activate a specific file system with some options. When the filesystem cache manager is tuned the timer may be started. The timer may be in communication with the filesystem cache manager, such that the filesystem cache manager may determine when the specified time interval is reached. When the timer reaches the specified time interval the filesystem cache manager may activate the cache elimination instruction. In various embodiments, a second timer may be started after the completion of the cache elimination instruction. Another cache elimination instruction may be activated when the second timer reaches a second specified time interval. The second timer may be in communication with the filesystem cache manager, such that the filesystem cache manager may determine when the second specified time interval is reached. In various embodiments, the use of the timers, specified time intervals, and cache elimination instructions may have an advantage in that rather than relying on the file cache reaching a maximum file page threshold or when running low on free memory to free up file cache, the filesystem cache manager may instead free up file cache at regular intervals. It is contemplated that any number or combinations of timers, specified time intervals, and cache elimination instructions may be used in various embodiments.

Figure 1:
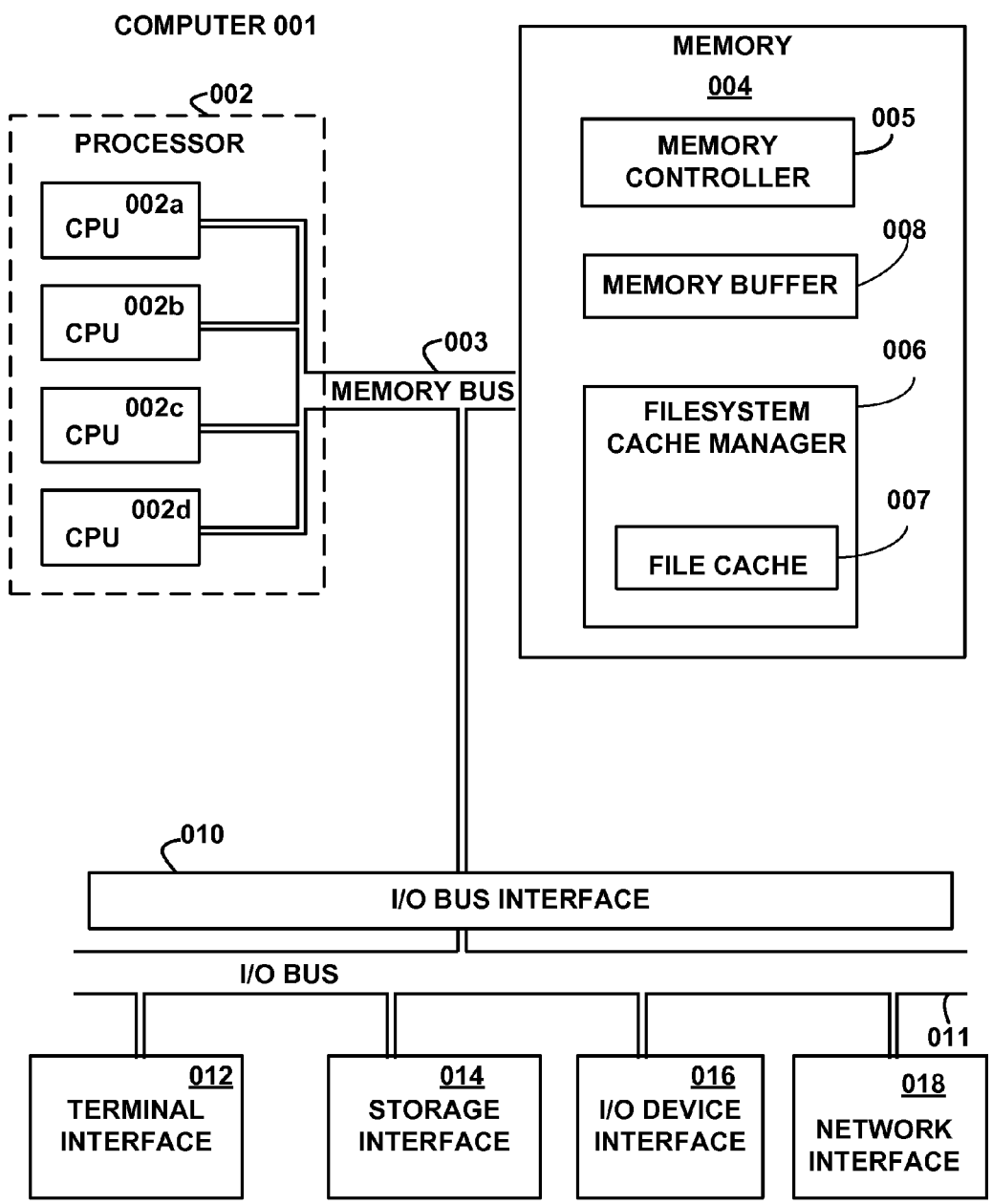
FIG. 1 depicts a high-level block diagram of an exemplary system according to an embodiment of the invention.

FIG. 1 depicts a high-level block diagram of an exemplary system for implementing an embodiment of the invention. The mechanisms and apparatus of embodiments of the present invention apply equally to any appropriate computing system. The major components of the computer system 001 include one or more CPUs 002, a memory 004, a terminal interface 012, a storage interface 014, an I/O (Input/Output) device interface 016, and a network interface 018, all of which are communicatively coupled, directly or indirectly, for inter-component communication via a memory bus 003, an I/O bus 011, and an I/O bus interface unit 010.

The computer system 001 contains one or more general-purpose programmable central processing units (CPUs) 002A, 002B, 002C, and 002D, herein generically referred to as the CPU 002. In an embodiment, the computer system 001 contains multiple processors typical of a relatively large system; however, in another embodiment the computer system 001 may alternatively be a single CPU system. Each CPU 002 executes instructions stored in the memory 004 and may comprise one or more levels of on-board cache.

In an embodiment, the memory 004 may comprise a random-access semiconductor memory, storage device, or storage medium (either volatile or non-volatile) for storing data and programs. In another embodiment, the memory 004 represents the entire virtual memory of the computer system 001, and may also include the virtual memory of other computer systems coupled to the computer system 001 or connected via a network. The memory 004 is conceptually a single monolithic entity, but in other embodiments the memory 004 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 004 may contain elements for control and flow of memory used by the CPU 002. This may include all or a portion of the following: a memory controller 005, a memory buffer 008, and a filesystem cache manager 006. In various embodiments the filesystem cache manager may include a file cache 007. In various embodiments, these elements may be connected with buses for communication of data and instructions. For example, the storage interface 014 may feed directly, or have a separate bus system, to the filesystem manager 006. In other embodiments, these elements may be combined into single chips that perform multiple duties or integrated into various types of memory modules. The illustrated elements are shown as being contained within the memory 004 in the computer system 001, in other embodiments some or all of them may be on different computer systems and may be accessed remotely, e.g., via a network.

Although the memory bus 003 is shown in FIG. 1 as a single bus structure providing a direct communication path among the CPUs 002, the memory 004, and the I/O bus interface 010, the memory bus 003 may in fact comprise multiple different buses or communication paths, which may be arranged in various forms such as point-to-point links in hierarchical, star or web configurations, multiple hierarchical buses, parallel and redundant paths, or any other appropriate type of configuration. Furthermore, while the I/O bus interface 010 and the I/O bus 011 are shown as single respective units, the computer system 001 may, in fact, contain multiple I/O bus interface units 010, multiple I/O buses 011, or both. While multiple I/O interface units are shown, which separate the I/O bus 011 from various communications paths running to the various I/O devices, in other embodiments some or all of the I/O devices are connected directly to one or more system I/O buses.

In various embodiments, the computer system 001 is a multi-user mainframe computer system, a single-user system, or a server computer or similar device that has little or no direct user interface, but receives requests from other computer systems (clients). In other embodiments, the computer system 001 is implemented as a desktop computer, portable computer, laptop or notebook computer, tablet computer, pocket computer, telephone, smart phone, or any other appropriate type of electronic device.

Figure 2:
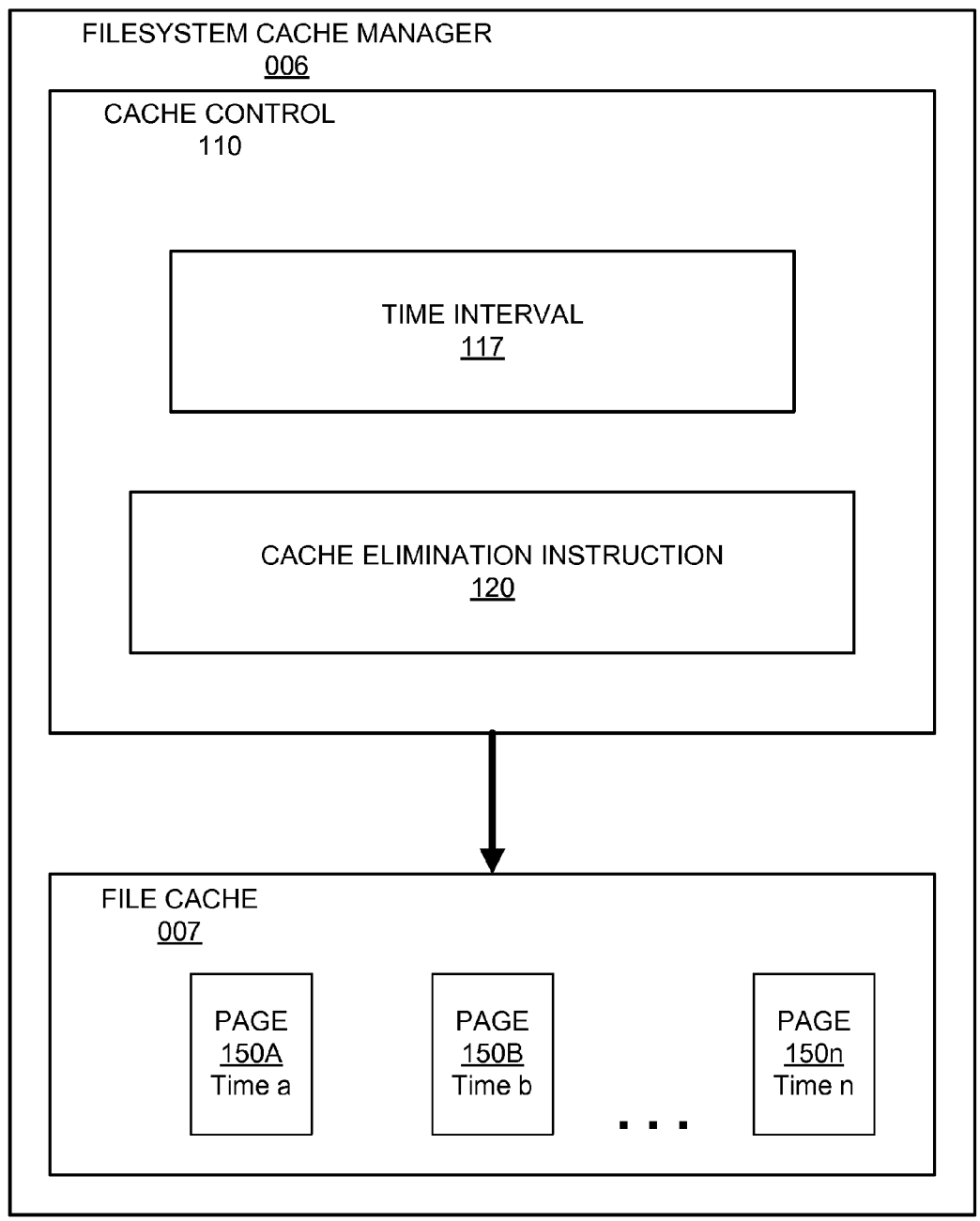
FIG. 2 depicts a high-level block diagram of an exemplary cache, according to an embodiment.

FIG. 2 depicts a high-level block diagram of an exemplary part of a cache, specifically filesystem cache manager 006, according to an embodiment. In various embodiments, file cache 007 storage may contain file pages 150A through 150n. As previously mentioned, file pages 150A-150n (generically referred to as 150) may each be for different applications or data. In the illustrated embodiments, filesystem cache manager 006 may contain a cache control 110. Cache control 110 are the hardware, software, firmware elements that are used by filesystem cache manager 006 to manage file pages 150A-150n in file cache 007. Cache control 110 may determine when, how, and in what way to eliminate file pages, 150A-150n (generally referred to as 150), from file cache 007. Cache control 110 may include cache elimination instruction 120. In various embodiments, tuning by the mount command may include commands or instructions installed in filesystem cache manager 006 specifying the cache elimination instruction 120. The mount command tuning may include commands or instructions installed in filesystem cache manager 006 for a specified time interval 117. In various embodiments, the mount command tuning may also include instructions to start a timer upon completion of installation. In various embodiments, the timer may be started by the mount command, entities available to the mount command such as the kernel, device driver, or the filesystem cache manager 006. The timer may be part of cache control 110, another element in filesystem cache manager 006, file cache 007, memory 004, or may be remote and in communication and available to the mount command. The file cache 007 of filesystem cache manager 006 may be immune or protected from external cache elimination instructions from other sources until the specified time interval is reached. External cache elimination instructions may be run by or triggered by entities external from the filesystem cache manager 006. When the timer reaches the specified time interval 117, cache control 110 may trigger the activation of a cache elimination instruction 120.

Cache control 110 may have one or more cache elimination instructions 120. In various embodiments, the cache elimination instructions 120 may be general to all file pages 150A-150n stored in the file cache 007 or specific to individual files pages or file pages associated with particular applications or data. Cache elimination instructions 120 may be algorithms or programs used to determine what file pages 150A-150n may be eliminated from the file cache 007. One example of a cache elimination instruction 120 is a command that uses a Least Recently Used (LRU) algorithm. The LRU algorithm may discard the least recently used items first from the file cache 007. The LRU algorithm may require keeping track of chronological file page usage. General implementations of this technique may require keeping "age bits" for file pages and track the "Least Recently Used" file page based on the age-bits. In such an implementation, every time a file page is used, the age of all other file pages may change.

In computing, cache elimination instructions 120 are sometimes referred to as cache algorithms, replacement algorithms, or replacement policies. Cache elimination instructions 120 may be optimizing instructions or algorithms that the program or a hardware-maintained structure of cache control 110 can follow to manage file cache 007. In various embodiments, when file cache 007 is full, the algorithm may be used to choose which file pages, any of 150A-150n, to discard to make room for the new file pages. In various embodiments, the activation of cache elimination instruction 120 by cache control 110 may not result in immediate elimination of any file page 150 installed in the file cache 007.

While the timer is running, a LRU type of cache elimination instruction 120 may be run by various entities in memory 004. In various embodiments, this may be done due to the computer 001 being low on memory. Mount command 115 may include instructions that result in the cache control 110 making the file cache 007 immune from, such as protected or ignoring, the external cache elimination instructions. File pages 150 in the file cache 007 may be immune from external cache elimination instructions until the timer reaches the specified time interval 117. When the timer reaches the specified time interval 117 file pages 150 may no longer be immune from external cache elimination instructions. In various embodiments, a cache elimination instruction 120 may be activated when the specified time interval 117 is reached. As previously mentioned, the completion of cache elimination instruction 120 may result in the starting of a second time interval and a second cache elimination instruction. In various embodiments, the second time interval may include the immunity, or protection, of the file cache 007 from external cache elimination instructions during the second specified time interval.

The specified time interval 117 may be of any measurable value to cache control 110. In some embodiments, time interval 117 may be measured in actual time such as seconds. For example, the time interval for a first filesystem cache manager may be 20 seconds and for a second filesystem cache manager may be 60 seconds. Other embodiments may have time intervals of any duration. In other embodiments, time interval 117 may be measured in a measurable value that may equate to a measurable time. For example, time interval 117 may be measured in clock cycles by cache control 110. In various embodiments, the specified time interval is based on historical data from the LRU.

In various embodiments, computer system 001 may have multiple filesystem cache managers 006. Each filesystem cache manager 006 may have a one or more specified time intervals 117. In various embodiments, the multiple filesystem cache managers 006 may share a single file cache 007 while retaining separate cache controls 110 for each ones file pages 150. For example, a first file system cache manager may use no specified time interval 117 for first file system cache manager respective file pages. A second file system cache manager may have a specified time interval 117 of 20 seconds for second file system cache manager respective file pages. In various embodiments, the cache elimination instructions may vary between the file system cache managers.

Figure 3:
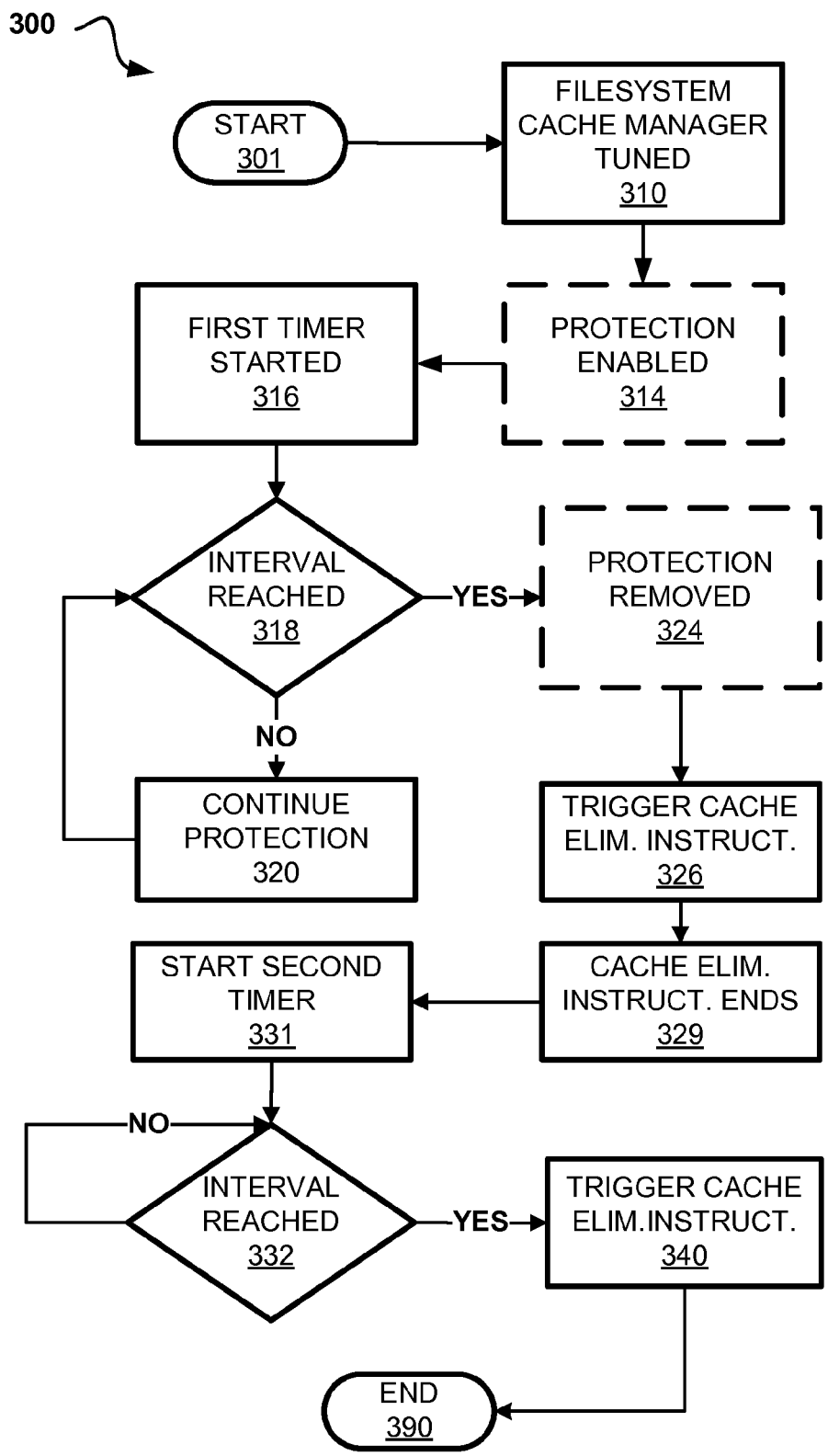
FIG. 3 is a flowchart illustrating a method for managing a file cache with a filesystem cache manager, according to an embodiment.

FIG. 3 is a flowchart illustrating a method 300 for managing a file cache with a filesystem cache manager, according to an embodiment. Method 300 may start at block 301. In block 310, filesystem cache manager 310 may be tuned by a mount command. As previously mentioned, mount command 115 may include specified time interval 117 that may be installed in cache control 110 of filesystem cache manager 006. In optional block 314, the file cache 007 may have protection from external cache elimination instructions enabled. In block 316, the first timer may be started by cache control 110. In various embodiments, the activities of blocks 314 and 316 may be rearranged or done in parallel. In block 318, a check is done to see if the first specified time interval, such as specified time interval 117, has been reached by first timer.

If the first specified time interval has not been reached method 300 may proceed to block 320. In block 320, the protection from external cache elimination instructions may continue. The method may cycle back to block 318. If the first specified time interval has been reached method 300 may proceed to optional block 324. In block 324, the file cache 007 may have protection from external cache elimination instructions removed or disabled. Method 300 may proceed to block 326 and the triggering of a first cache elimination instruction, such as cache elimination instruction 120. In block 329, the first cache elimination instruction may end or be completed.

In block 331, the second timer may be started by cache control 110. In block 332, a check is done to see if the second specified time interval, such as specified time interval 117, has been reached by second timer. If the second specified time interval has not been reached method 300 may return to block 332. If the second specified time interval has been reached method 300 may proceed to block 340. In block 340, the cache controls 110 may trigger the second cache elimination instruction, such as cache elimination instruction 120. The method may end in block 390. In various embodiments, the second timer and specified time interval may include immunity, or protection from, external cache elimination instructions similar to the optional protection or immunity illustrated previously. In various embodiments, first timer and second timer may be the same timer used for both first and second specified time intervals. In various embodiments, activities of method 300 may be eliminated, combined, or more numerous than illustrated Embodiments described herein may be in the form of a system, a method, or a computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Embodiments of the invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments are not intended to limit the present invention. Indeed, other alternative hardware and/or program environments may be used without departing from the scope of embodiments of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope and spirit of the disclosed subject matter.

What is claimed is:

1. A computer program product for managing a file cache, the computer program product comprising a computer readable storage medium having program code embodied therewith, the program code executable by a computer system to perform a method comprising:
   identifying a primary elimination policy associated with the file cache, the file cache having a number of available cache pages, the primary elimination policy dependent on whether the file cache is full;
   receiving a first filesystem mount command for a first filesystem, the first filesystem associated with a first set of file pages, the first filesystem mount command associating the first set of file pages with a secondary elimination policy, the first filesystem mount command specifying a time interval for the secondary elimination policy, the secondary elimination policy configured to use a Least Recently Used (LRU) algorithm, in conjunction with historical LRU data, to modify the time interval, the secondary elimination policy different from the primary elimination policy;
   storing the first set of file pages in the file cache, the first set of file pages including a first file page stored in a first cache page and further including a second file page stored in a second cache page;
   determining that the time interval has elapsed since the receiving the first filesystem mount command;
   removing, based on the determining, the first file page from the file cache according to the secondary elimination policy, the removing returning the first cache page to the number of available cache pages, wherein allowing the first file page to remain stored in the file cache does not violate the primary elimination policy; and
   not removing, based on the determining, the second file page from the file cache according to the secondary elimination policy.

2. The computer program product of claim 1, the method further comprising:
   receiving a second filesystem mount command for a second filesystem, the second filesystem associated with a second set of file pages different from the first set of file pages, the second filesystem mount command associating the second set of file pages with a second secondary elimination policy different from the secondary elimination policy, the second filesystem mount command specifying a second time interval for the second secondary elimination policy, the second time interval different from the time interval;
   storing the second set of file pages in the file cache, the second set of file pages including a third file page stored in a third cache page and further including a fourth file page stored in a fourth cache page;
   second determining that the second time interval has elapsed since the receiving the second filesystem mount command;
   removing, based on the second determining, the third file page from the file cache according to the second secondary elimination policy, the removing returning the third cache page to the number of available cache pages; and not removing, based on the second determining, the fourth file page from the file cache according to the second secondary elimination policy.

3. The computer program product of claim 1, wherein the first set of file pages further includes a third file page stored in a third cache page, the method further comprising:
further removing, based on the determining, the third file page from the file cache according to the secondary elimination policy, the further removing returning the third cache page to the number of available cache pages.

4. The computer program product of claim 1, wherein the second file page was more recently used than the first file page.

5. The computer program product of claim 1, wherein the first set of file pages further includes a third file page stored in a third cache page, the method further comprising:
not removing, based on the determining, the third file page from the file cache according to the secondary elimination policy;
second determining that the time interval has elapsed since the removing the first file page from the file cache;
removing, based on the second determining, the second file page from the file cache according to the secondary elimination policy, the removing returning the second cache page to the number of available cache pages; and
not removing, based on the second determining, the third file page from the file cache according to the secondary elimination policy.

6. The computer program product of claim 1, the method further comprising:
receiving a second filesystem mount command for a second filesystem, the second filesystem associated with a second set of file pages different from the first set of file pages, the second filesystem mount command not associating the second set of file pages with any secondary elimination policy;
storing the second set of file pages in the file cache, the second set of file pages including a third file page stored in a third cache page;
second determining that the primary elimination policy requires removing a file page from the file cache;
third determining that the primary elimination policy targets the second file page for removal from the file cache;
fourth determining that the time interval has not elapsed since the removing the first file page from the file cache;
not removing, based on the fourth determining and overriding the third determining, the second file page from the file cache according to the secondary elimination policy; and
removing, based on the second determining and further based on the fourth determining, the third file page from the file cache according to the primary elimination policy, the removing returning the third cache page to the number of available cache pages.

7. The computer program product of claim 6, wherein the primary elimination policy uses the LRU algorithm, and wherein the third file page was more recently used than the second file page.

8. A computer system for managing a file cache, the computer system comprising:
a memory; and
a processor in communication with the memory, wherein the computer system is configured to perform a method comprising:
identifying a primary elimination policy associated with the file cache, the file cache having a number of available cache pages, the primary elimination policy dependent on whether the file cache is full;
receiving a first filesystem mount command for a first filesystem, the first filesystem associated with a first set of file pages, the first filesystem mount command associating the first set of file pages with a secondary elimination policy, the first filesystem mount command specifying a time interval for the secondary elimination policy, the secondary elimination policy configured to use a Least Recently Used (LRU) algorithm, in conjunction with historical LRU data, to modify the time interval, the secondary elimination policy different from the primary elimination policy;
storing the first set of file pages in the file cache, the first set of file pages including a first file page stored in a first cache page and further including a second file page stored in a second cache page;
determining that the time interval has elapsed since the receiving the first filesystem mount command;
removing, based on the determining, the first file page from the file cache according to the secondary elimination policy, the removing returning the first cache page to the number of available cache pages, wherein allowing the first file page to remain stored in the file cache does not violate the primary elimination policy; and
not removing, based on the determining, the second file page from the file cache according to the secondary elimination policy.

9. The computer system of claim 8, the method further comprising:
receiving a second filesystem mount command for a second filesystem, the second filesystem associated with a second set of file pages different from the first set of file pages, the second filesystem mount command associating the second set of file pages with a second secondary elimination policy different from the secondary elimination policy, the second filesystem mount command specifying a second time interval for the second secondary elimination policy, the second time interval different from the time interval;
storing the second set of file pages in the file cache, the second set of file pages including a third file page stored in a third cache page and further including a fourth file page stored in a fourth cache page;
second determining that the second time interval has elapsed since the receiving the second filesystem mount command;
removing, based on the second determining, the third file page from the file cache according to the second secondary elimination policy, the removing returning the third cache page to the number of available cache pages; and
not removing, based on the second determining, the fourth file page from the file cache according to the second secondary elimination policy.

10. The computer system of claim 8, wherein the first set of file pages further includes a third file page stored in a third cache page, the method further comprising:
further removing, based on the determining, the third file page from the file cache according to the secondary elimination policy, the further removing returning the third cache page to the number of available cache pages.

11. The computer system of claim 8, wherein the second file page was more recently used than the first file page.

12. The computer system of claim 8, wherein the first set of file pages further includes a third file page stored in a third cache page, the method further comprising:
   not removing, based on the determining, the third file page from the file cache according to the secondary elimination policy;
   second determining that the time interval has elapsed since the removing the first file page from the file cache;
   removing, based on the second determining, the second file page from the file cache according to the secondary elimination policy, the removing returning the second cache page to the number of available cache pages; and
   not removing, based on the second determining, the third file page from the file cache according to the secondary elimination policy.

13. The computer system of claim 8, the method further comprising:
   receiving a second filesystem mount command for a second filesystem, the second filesystem associated with a second set of file pages different from the first set of file pages, the second filesystem mount command not associating the second set of file pages with any secondary elimination policy;
   storing the second set of file pages in the file cache, the second set of file pages including a third file page stored in a third cache page;
   second determining that the primary elimination policy requires removing a file page from the file cache;
   third determining that the primary elimination policy targets the second file page for removal from the file cache;
   fourth determining that the time interval has not elapsed since the removing the first file page from the file cache;
   not removing, based on the fourth determining and overriding the third determining, the second file page from the file cache according to the secondary elimination policy; and
   removing, based on the second determining and further based on the fourth determining, the third file page from the file cache according to the primary elimination policy, the removing returning the third cache page to the number of available cache pages.

14. The computer system of claim 13, wherein the primary elimination policy uses the LRU algorithm, and wherein the third file page was more recently used than the second file page.

* * * * *